US010229035B2

(12) United States Patent
Deutschle et al.

(10) Patent No.: US 10,229,035 B2
(45) Date of Patent: *Mar. 12, 2019

(54) INSTRUCTION GENERATION BASED ON SELECTION OR NON-SELECTION OF A SPECIAL COMMAND

(71) Applicant: INTERNATIONAL BUSINESS MACHINES CORPORATION, Armonk, NY (US)

(72) Inventors: Joerg Deutschle, Winnenden (DE); Ursel Hahn, Lichtenwald (DE); Joerg Walter, Tuebingen (DE); Ernst-Dieter Weissenberger, Ober-Hilbersheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,921

(22) Filed: Nov. 9, 2017

(65) Prior Publication Data

US 2018/0067840 A1 Mar. 8, 2018

Related U.S. Application Data

(63) Continuation of application No. 13/666,081, filed on Nov. 1, 2012, now Pat. No. 9,904,616.

(30) Foreign Application Priority Data

Dec. 14, 2011 (EP) .................................... 11193427

(51) Int. Cl.

*G06F 11/36* (2006.01)
*G06F 11/263* (2006.01)

(52) U.S. Cl.

CPC ........ *G06F 11/3664* (2013.01); *G06F 11/263* (2013.01); *G06F 11/3684* (2013.01)

(58) Field of Classification Search

CPC ............. G06F 9/30145; G06F 9/30167; G06F 11/3684; G06F 11/263

See application file for complete search history.

(56) References Cited

U.S. PATENT DOCUMENTS 4,428,044 A 1/1984 Liron
5,771,241 A 6/1998 Brummel
(Continued)

OTHER PUBLICATIONS

Office Action in U.S. Appl. No. 13/666,081 dated May 7, 2015, 18 pgs.
(Continued)

*Primary Examiner* — Aimee Li
*Assistant Examiner* — William V Nguyen
(74) *Attorney, Agent, or Firm* — Steven Chiu; Matthew M. Hulihan; Heslin Rothenberg Farley & Mesiti PC

(57) ABSTRACT

Generating instructions, in particular for mailbox verification in a simulation environment. A sequence of instructions is received, as well as selection data representative of a plurality of commands including a special command. Repeatedly selecting one of the plurality of commands and outputting an instruction based on the selected command. The outputting of an instruction includes outputting a next instruction in the sequence of instructions if the selected command is the special command, and outputting an instruction associated with the command if the selected command is not the special command.

17 Claims, 6 Drawing Sheets

(56) References Cited

U.S. PATENT DOCUMENTS

| | | | |
|---|---|---|---|
| 6,073,159 | A | 6/2000 | Emer et al. |
| 6,691,308 | B1 | 2/2004 | Kasper |
| 7,398,515 | B2 | 7/2008 | Atoji et al. |
| 7,802,146 | B2 | 9/2010 | Wong et al. |
| 2001/0029557 | A1 | 10/2001 | Leenstra et al. |
| 2004/0215929 | A1 | 10/2004 | Floyd et al. |
| 2004/0215947 | A1 | 10/2004 | Ward, III et al. |
| 2007/0113058 | A1 | 5/2007 | Tran et al. |
| 2008/0126771 | A1 | 5/2008 | Chen et al. |
| 2011/0167309 | A1 | 7/2011 | Rajski et al. |
| 2012/0017069 | A1 | 1/2012 | Bourd et al. |

OTHER PUBLICATIONS

Final Office Action in U.S. Appl. No. 13/666,081 dated Nov. 2, 2015, 19 pgs.
Office Action in U.S. Appl. No. 13/666,081 dated May 17, 2016, 13 pgs.
Final Office Action in U.S. Appl. No. 13/666,081 dated Oct. 19, 2016, 9 pgs.
Office Action in U.S. Appl. No. 13/666,081 dated Mar. 24, 2017, 10 pgs.
Notice of Allowance in U.S. Appl. No. 13/666,081 dated Oct. 18, 2017, 15 pgs.

290
200
MAILBOX CONTROL REGISTER
220
MAILBOX HEADER REGISTER
240
MAILBOX INTERRUPT REGISTER
260
A
B
MAILBOX DATA REGISTER
280- 0
MAILBOX DATA REGISTER
280- 1
MAILBOX DATA REGISTER
280- N 400
410
CHECK
READ OUT CONTROL REGISTER
420
READ OUT HEADER REGISTER
430
READ OUT DATA REGISTER(S)
440
CLEAR BITS OF MAILBOX REGISTERS
450
CLEAR INTERRUPT REGISTER
460

INSTRUCTION GENERATION BASED ON SELECTION OR NON-SELECTION OF A SPECIAL COMMAND

BACKGROUND

Aspects relate to a method of generating instructions, an instruction generating system as well as a corresponding computer program product. In particular, an aspect relates to generating instructions for mailbox verification in a simulation environment.

Mailbox communication provides a message-passing interface between two parts of a computer system, e.g. between two central processing units or from a service processor to a central processing unit. A mailbox provides a handshake mechanism for a "send" then "receive" sequence to ensure that no messages are getting lost. This means that a message can only be written into the mailbox if no other message is already in the mailbox.

BRIEF SUMMARY

An aspect of the present disclosure teaches a method of generating instructions in which commands are selected in accordance with a desired statistical frequency, e.g. randomly based on a weight of the respective commands. If a "mailbox" command is thus selected, the actual instruction to be executed is then "popped off" a sequenced list of mailbox instructions. In this manner, it can be ensured that mailbox commands only occur with the desired statistical frequency, that the mailbox commands are appropriately intermingled with other commands, yet that the mailbox commands do not occur in an order that is unrealistic. Accordingly, a simulation employing such a generation of instructions will be less time-consuming and more accurate since the simulation is not encumbered by unrealistic scenarios. In turn, this increases the efficiency with which a system being simulated can be debugged since the debugging is not encumbered by reports of apparent bugs, which bugs would not actually occur in real life situations.

In one aspect, the present disclosure relates to a method of generating instructions. The generated instructions may be computer instructions in any programming language, e.g. in an assembler language. The generated instructions may be used in a simulation, e.g. in a simulation of a system under design. For example, the generated instructions may be used for mailbox verification in a simulation environment. Accordingly, an aspect of the present disclosure likewise relates to a method of mailbox verification as well as to a method of (system) simulation.

The method may comprise receiving selection data representative of a plurality of commands. The selection data may represent the respective commands by designating a (unique) command identification code, by including a name of the command and/or by including the actual command, e.g. in binary, hexadecimal or textual representation. The plurality of commands may comprise a special command, e.g. a command that is identified/known as having special significance.

In one embodiment, the method may comprise (repeatedly) selecting one of the plurality of commands, i.e. (repeatedly) selecting a command from among the plurality of commands. In another embodiment, the method may comprise outputting an instruction based on the selected command, e.g. for each of the respectively selected commands. In other words, the combined action of selecting and outputting may be carried out repeatedly.

The selecting may be effected in accordance with a given statistical frequency. In other words, the selecting may be effected such that individual commands of the plurality of commands are selected in accordance with a given statistical frequency, e.g. in accordance with a user-defined statistical frequency. In this respect, the method may comprise receiving user input specifying a statistical frequency for (each of) one or more or all of the plurality of commands, e.g. relative to one or more or each/all other command(s) of the plurality of commands.

The method may comprise obtaining a random number, e.g. for each iteration of the selecting, i.e. each time one of the plurality of commands is to be selected. For example, the random number may be received from an external system, from a random number generator or from a pool of random numbers. Similarly, the random number may be obtained by generating a random number. The random number need not be truly random, but may also be a pseudorandom number. Said (repeatedly) selecting of one of the plurality of commands may be based on the (respective) random number.

The plurality of commands may contain repetitions of individual commands. For one or more or all of the commands in the plurality of commands, the ratio of the total number of instances of the respective command in the plurality of commands to the total number of commands in the plurality of commands may correspond to the statistical frequency with which the respective command is to be selected. The method may comprise (repeatedly) randomly selecting one of such a plurality of commands, e.g. based on the (respective) random number.

The selection data may be representative, for one or more or each of the plurality of commands, of a weight associated with the respective command. The weight may correspond to/be representative of the statistical frequency with which the associated command is to be selected. The method may comprise (repeatedly) selecting one of the plurality of commands based on the weights and the (respective) random number. For example, the weight of each of the plurality of commands may be totaled to obtain a total weight and each of the plurality of commands may, based on the associated weight, be associated with a correspondingly large (i.e. as large as the numerical value of the respective, associated weight), unique sub-range of the range of numbers from 1 to the numerical value of the total weight. The random number may be normalized to the range of numbers from 1 to the numerical value of the total weight. The selection may be effected by selecting the command associated with the sub-range into which the normalized random number falls.

The method may comprise receiving a sequence of instructions, i.e. a set of instructions having a given order. The instructions may be programming language instructions that can be executed e.g. on computer hardware or in a simulation environment that simulates computer hardware. The instructions may be received in any suitable form, e.g. in the form of (unique) instruction identification codes and/or binary, hexadecimal or textual representations of the actual instructions. The sequence of instructions may comprise one or more mailbox instructions or consist entirely of mailbox instructions. Such mailbox instructions may include READ instructions, i.e. instructions to read data from a specified register of the mailbox, WRITE instructions, i.e. instructions to write data to a specified register of the mailbox, and/or CLEAR instructions, i.e. instructions to clear data from a specified register of the mailbox. The instructions in the sequence of instructions may be sequenced such that, if the instructions are executed in the given order, no illegal scenarios should occur.

In one embodiment, the method may comprise outputting an instruction based on a selected command.

The outputting may comprise outputting a next instruction in the sequence of instructions if the selected command is the special command. In other words, the outputting of an instruction may comprise outputting a single instruction from the sequence of instructions (namely the next instruction in the sequence) per iteration in which the selection of a command yields the special command. Once the end of the sequence of instructions has been reached, the first instruction in the sequence may be deemed to be the "next instruction." Similarly, once the end of the sequence of instructions has been reached, another sequence of instructions may be received and the first instruction in the newly received sequence of instructions may be deemed to be the "next instruction." Other variations of these principles for determining the "next instruction" should be readily recognizable to the person skilled in the art and are equally applicable. Accordingly, as used in the present disclosure, the expression "next instruction" need not be understood purely literally.

The outputting of an instruction based on a selected command may comprise outputting an instruction associated with the (respectively) selected command if the (respectively) selected command is not the aforementioned special command. In one embodiment, the instruction associated with the command may be the command itself. Similarly, the instruction associated with the command may be an instruction belonging to a collection/category of instructions designated by the command. Accordingly, the outputting of the instruction may comprise (randomly) selecting an instruction belonging to a collection/category of instructions designated by the command. Similarly, the outputting of the instruction may comprise (randomly) parameterizing the command into the instruction to be output. In this respect, the method may again comprise obtaining a random number, e.g. as discussed above.

For each of the plurality of commands other than the special command, the instruction(s) associated with said command may exclude mailbox instructions. Similarly, the outputting of an instruction based on a selected command if the (respectively) selected command is not the special command may exclude outputting a mailbox instruction.

While aspects of the present disclosure have been discussed hereinabove mainly in the form of a method, aspects may be embodied, mutatis mutandis, in the form of a computer program product or a system, e.g. an instruction generating system or a mailbox verification system, as will be appreciated by the person skilled in the art.

The system may be configured and adapted to effect any of the actions described above with respect to the disclosed method.

The system may comprise an instruction receiving component that receives a sequence of instructions as discussed herein.

The system may comprise a selection data receiving component that receives selection data as discussed herein.

The system may comprise a selecting component that selects one of the plurality of commands as discussed herein.

The system may comprise an output component that outputs an instruction based on a selected command as discussed herein.

The system may comprise a repetition component that repeatedly selects one of the plurality of commands and outputs an instruction based on the selected command as discussed herein, e.g. in conjunction with a selecting component and/or an output component of the system.

The system may comprise a random number obtaining component and/or a random number generating component for obtaining a random number as discussed herein.

Any of the aforementioned components of the system communicate with any other of the aforementioned components of the system. In this respect, the system may comprise one or more communication busses/links interconnecting the respective components.

DETAILED DESCRIPTION

In an aspect, the term "instruction" can be understood as a computer instruction that can be executed e.g. on computer hardware or in a simulation environment that simulates computer hardware. The term "command" can be understand as encompassing both instructions and collections/categories of instructions. For example, a command "no op" (no operation) does not require further parameterization to be executable. In contrast, some commands may require parameterization to become an instruction. For example, a command "reg write" (write to register), may require that the register to which data is to be written be specified to be executable. As such, the command "reg write" may designate the collection/category of instructions that write to the registers available in the given hardware. Similarly, a command may designate a collection/category of instructions where the conversion from command to instruction goes beyond mere parameterization (e.g. a command "reg op" (register operation) that designates a collection/category of instructions that includes register write operations, register read operations and register clear operations).

In an aspect, the term "receiving" may comprise receiving/obtaining the respective element/information from a storage medium, via a computer network and/or by user input. In an aspect, any "receiving" may be accompanied by a "storing" of the received element/information, e.g. in a computer memory, on a hard disk, in a flash storage device or in any other storage device. In other words, where the method comprises a receiving of an element/information, the method may comprise a storing of the received element/information.

Figure 1:
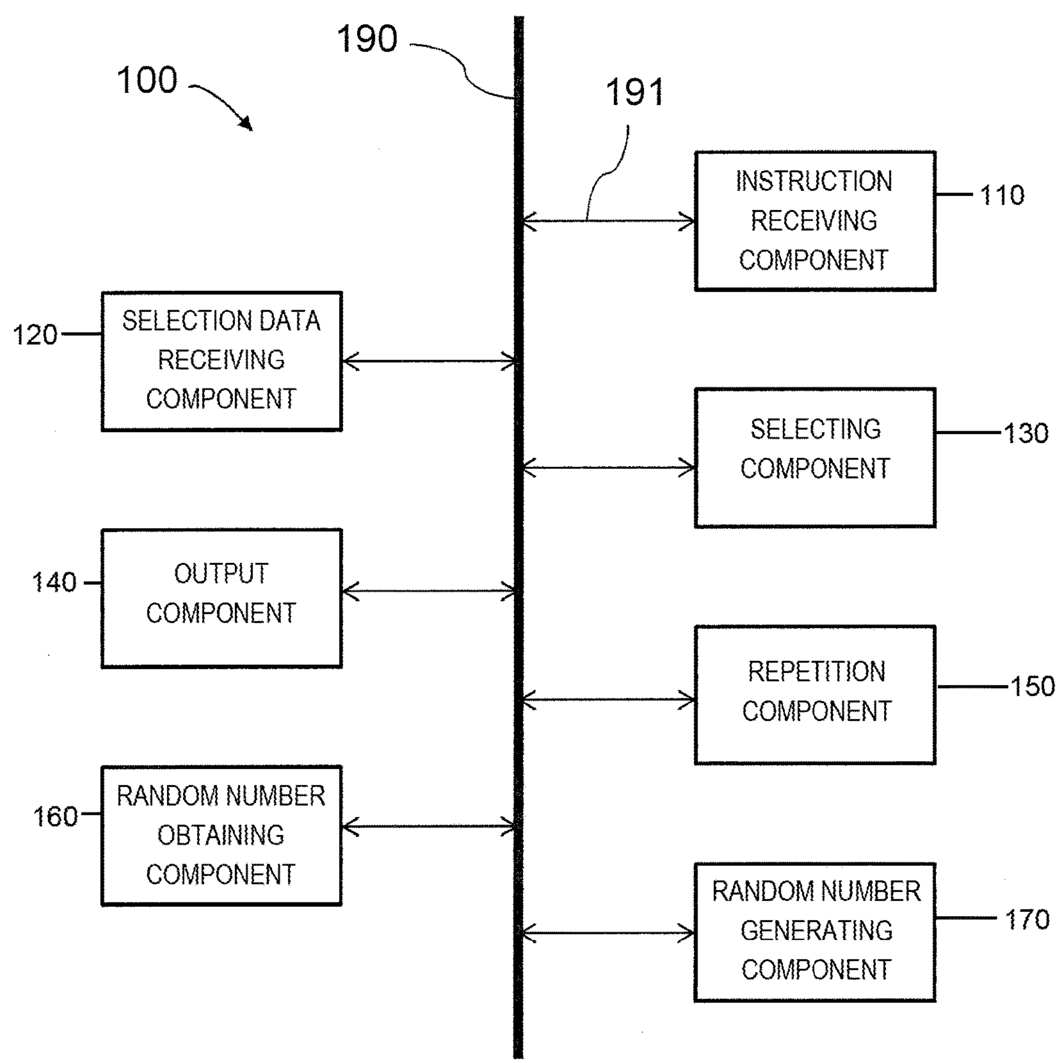
FIG. 1 schematically shows an embodiment of an instruction generating system in accordance with an aspect of the present disclosure.

FIG. 1 schematically shows an embodiment of an instruction generating system 100 in accordance with an aspect of the present disclosure, e.g. as described herein.

In the illustrated embodiment, instruction generating system 100 comprises an instruction receiving component 110, a selection data receiving component 120, a selecting component 130, an output component 140, a repetition component 150, a random number obtaining component 160, a random number generating component 170 and a communication bus 190 comprising a plurality of communication links 191 (for the sake of legibility, only one of the communication links bears a reference sign). Communication bus 190 and the communication links 191 communicatively interconnect the aforementioned components 110-170.

Figure 2:
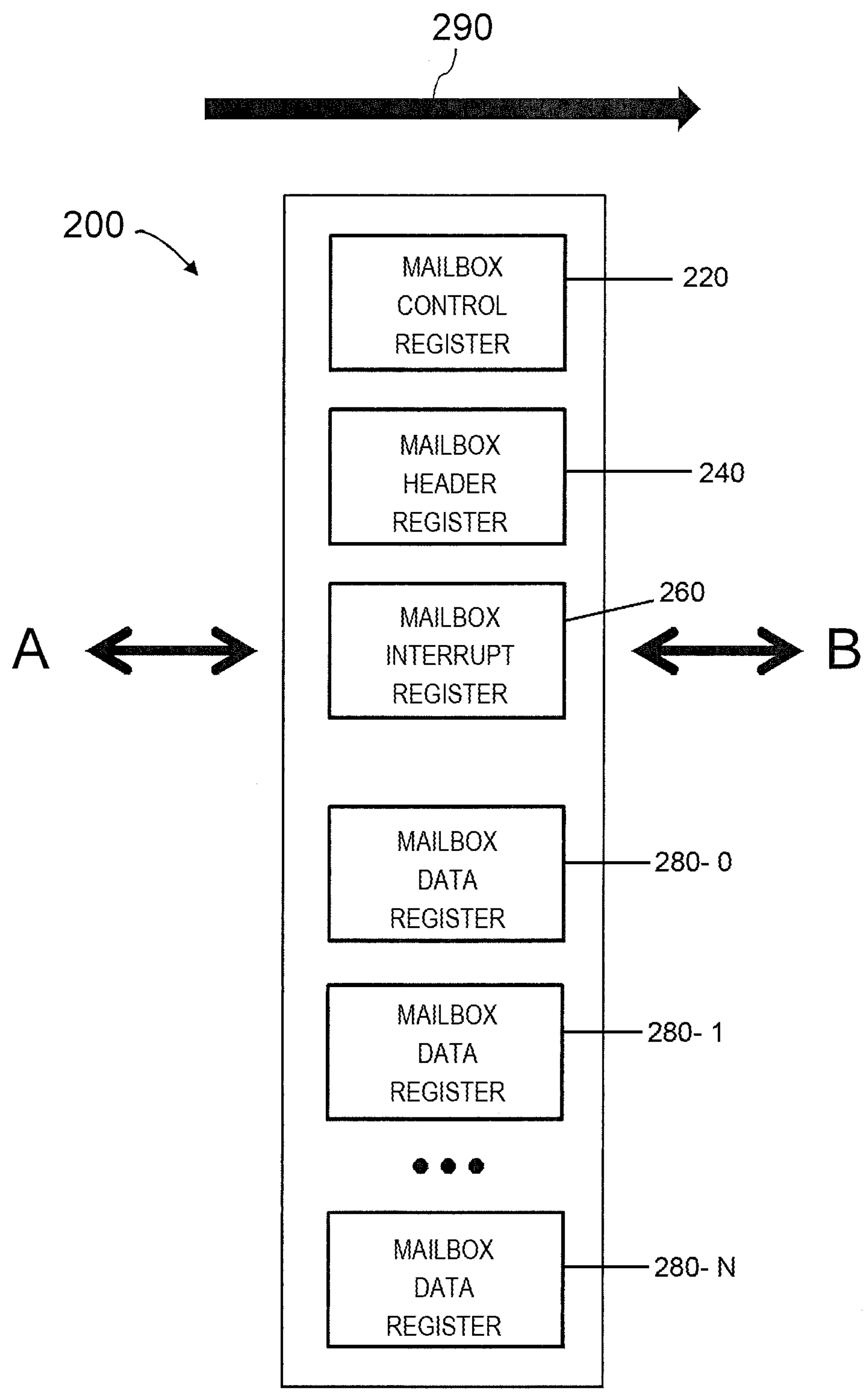
FIG. 2 schematically shows an embodiment of a mailbox in accordance with an aspect of the present disclosure.

FIG. 2 schematically shows an embodiment of a mailbox 200 in accordance with an aspect of the present disclosure, e.g. as described herein. In particular, FIG. 2 schematically depicts registers of the mailbox 200.

In the illustrated embodiment, mailbox 200 comprises a mailbox control register 220, a mailbox header register 240, a mailbox interrupt register 260 as well as a plurality (n+1) of mailbox data registers 280, schematically depicted in FIG. 2 as mailbox data registers 280-0 to **280-*n*. FIG. 2 also depicts a message flow direction 290**.

The registers 220 to 280 are used to pass messages in message flow direction 290 from Interface A to Interface B. Whereas Mailbox Data Registers 280-0 to **280-*n* contain the actual message data, registers 220 to 260 are used to transfer control information and control interaction between the communication partners. Control register 220 contains information indicating whether the mailbox is empty, so the data registers can be written, or if a message is pending which must be picked up by the receiver. Header register 240 contains information indicating which parts of the data registers are relevant. Interrupt register 260** controls how the mailbox is being serviced, e.g. by polling the control register or if an interrupt is generated whenever the mailbox needs to be serviced.

Figure 3:
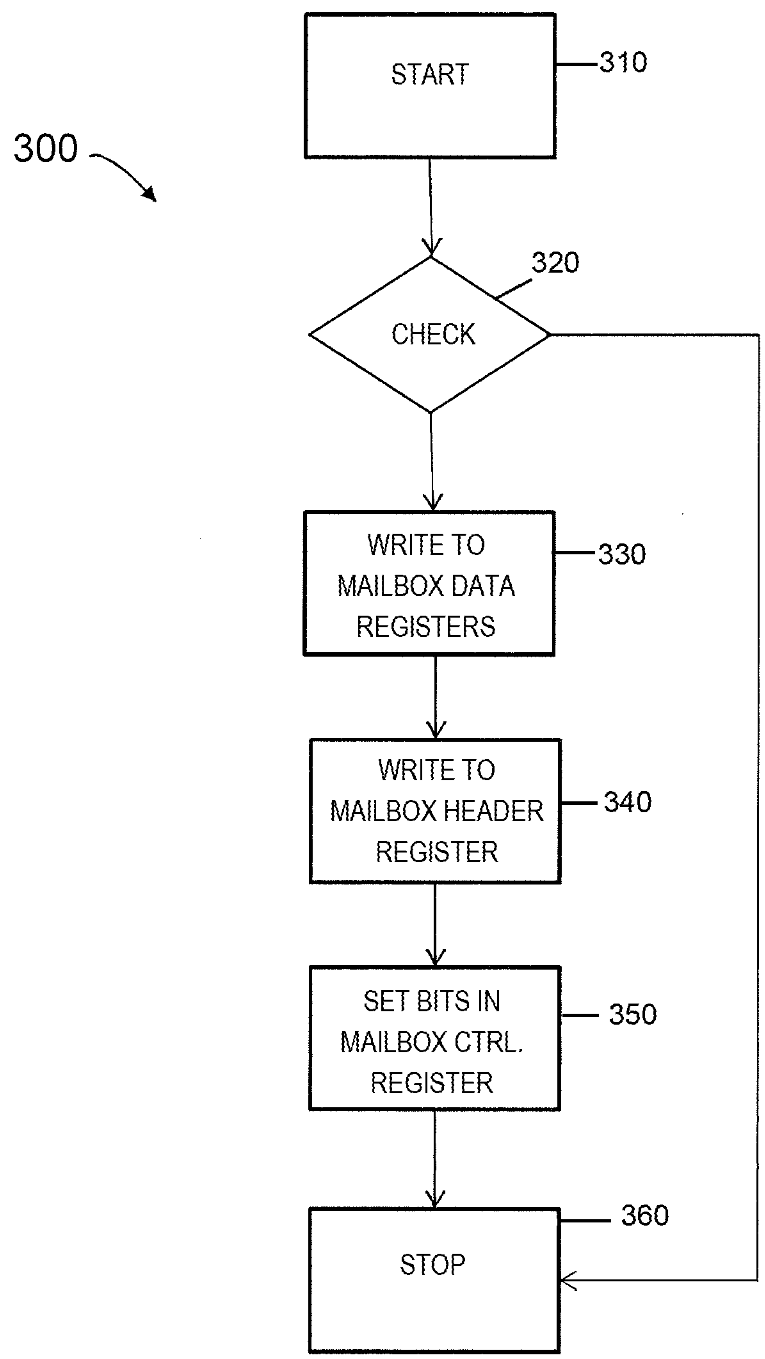
FIG. 3 schematically shows an embodiment of a mailbox communication sequence in accordance with an aspect of the present disclosure.

FIG. 3 schematically shows an embodiment of a mailbox communication sequence 300 in accordance with an aspect of the present disclosure, e.g. as described herein. In particular, FIG. 3 depicts a mailbox communication sequence 300 as viewed from a sending side, e.g. from the perspective of interface A in FIG. 2.

The sequence starts at step 310. At step 320, the sending side checks if the pending bit is off. If no, the mailbox is "full" and the sequence proceeds to step 360, where the sequence stops. If yes, the mailbox is empty and the sequence proceeds through steps 330 to 350, where a new message is sent. At step 330, the sending side writes to mailbox data registers 280. At step 340, the sending sides writes the mailbox header information to mailbox header register 240. Finally, at step 350, the message pending and permission to send bits are set in mailbox control register 220.

Figure 4:
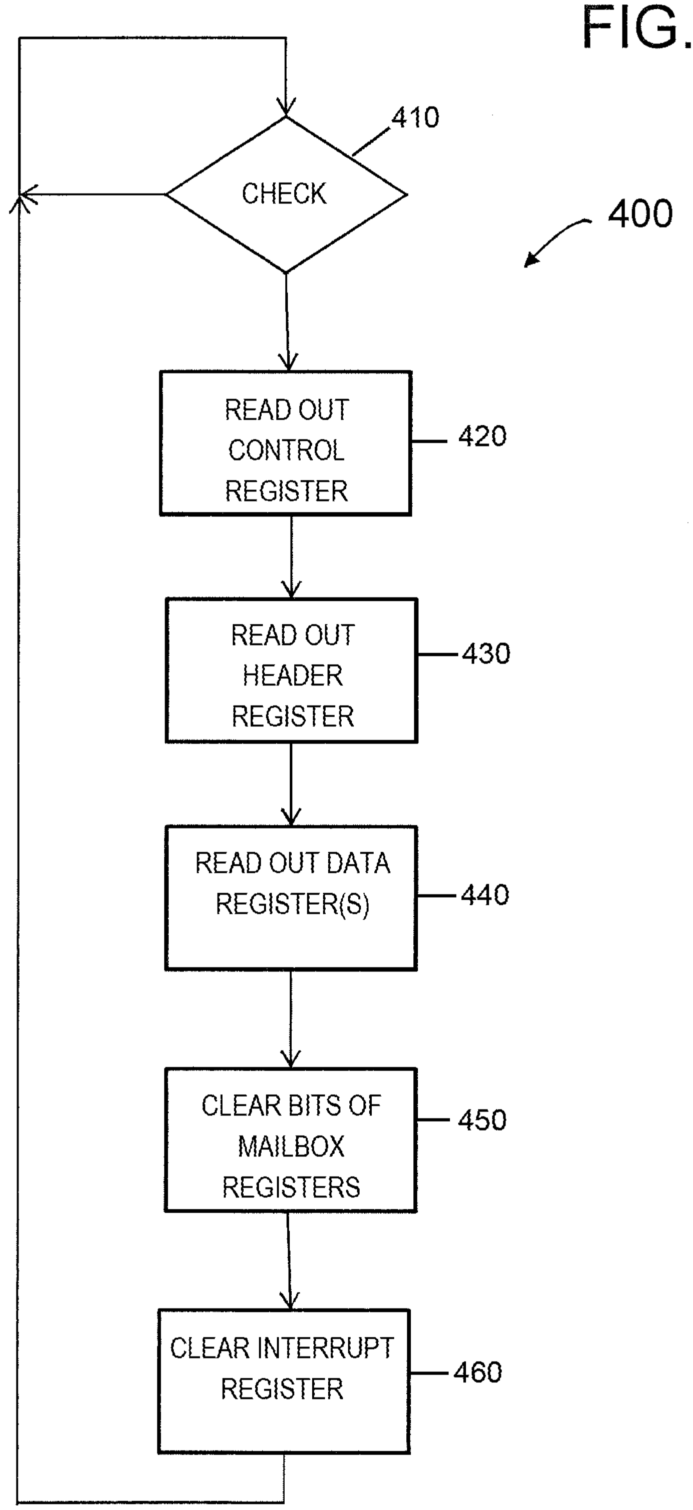
FIG. 4 schematically shows another embodiment of a mailbox communication sequence in accordance with an aspect of the present disclosure.

FIG. 4 schematically shows another embodiment of a mailbox communication sequence 400 in accordance with an aspect of the present disclosure, e.g. as described herein. In particular, FIG. 4 depicts a mailbox communication sequence 400 as viewed from a receiving side, e.g. from the perspective of interface B in FIG. 2.

At step 410, the receiving side checks whether the pending bit is on. Depending on the configuration of interrupt register 260, an interrupt may be generated on the receiving side. If interrupts are disabled or masked, the receiving side needs to poll mailbox control register 220 in order to detect a pending message. In other words, if the pending bit is off, the sequence returns to step 410. Otherwise, the sequence proceeds to step 420. To receive a message, the receiving side reads out control register 220 at step 420, header register 240 at step 430 and data registers 280 at step 440 for further processing. After receiving the message, the receiver clears the message pending and count bits of the mailbox registers at step 450 to confirm the reception of the message and clears interrupt register 260 at step 460 before returning to step 410.

Figure 5:
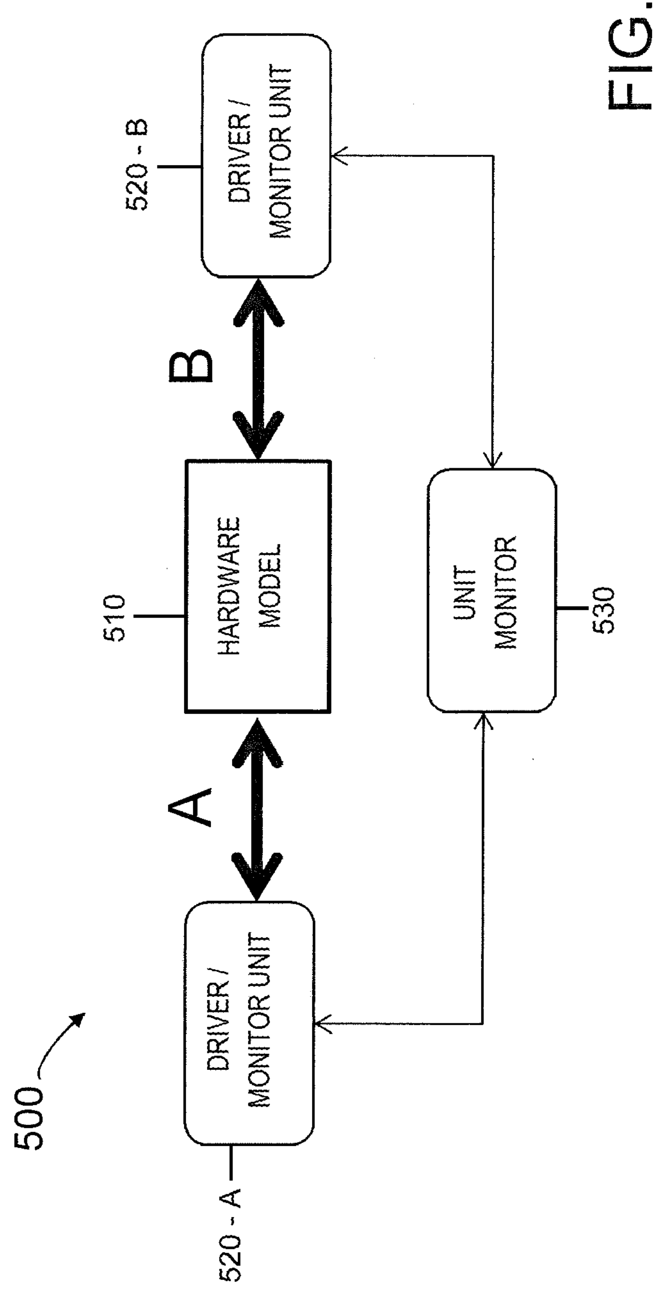
FIG. 5 schematically shows an embodiment of a verification environment in accordance with an aspect of the present disclosure.

FIG. 5 schematically shows an embodiment of a verification environment 500 in accordance with an aspect of the present disclosure, e.g. as described herein.

In the illustrated embodiment, the verification environment 500 includes a hardware model 510, driver/monitor units 520-A and 520-B and a unit monitor 530. Hardware model 510, i.e. a model of the device under verification (DUV), contains a model of the mailbox and is interfaced to driver/monitor units 520-A and 520-B that respectively represent a sending side (Interface A) and a receiving side (Interface B). Each of driver/monitor units 520-A and 520-B includes a code driver that stimulates the mailbox. Each of driver/monitor units 520-A and 520-B moreover includes an interface monitor that monitors the respective interface. The code drivers and/or the interface monitors may be written in C++. In order to predict results, unit monitor 530 contains a reference model of the DUV.

Figure 6:
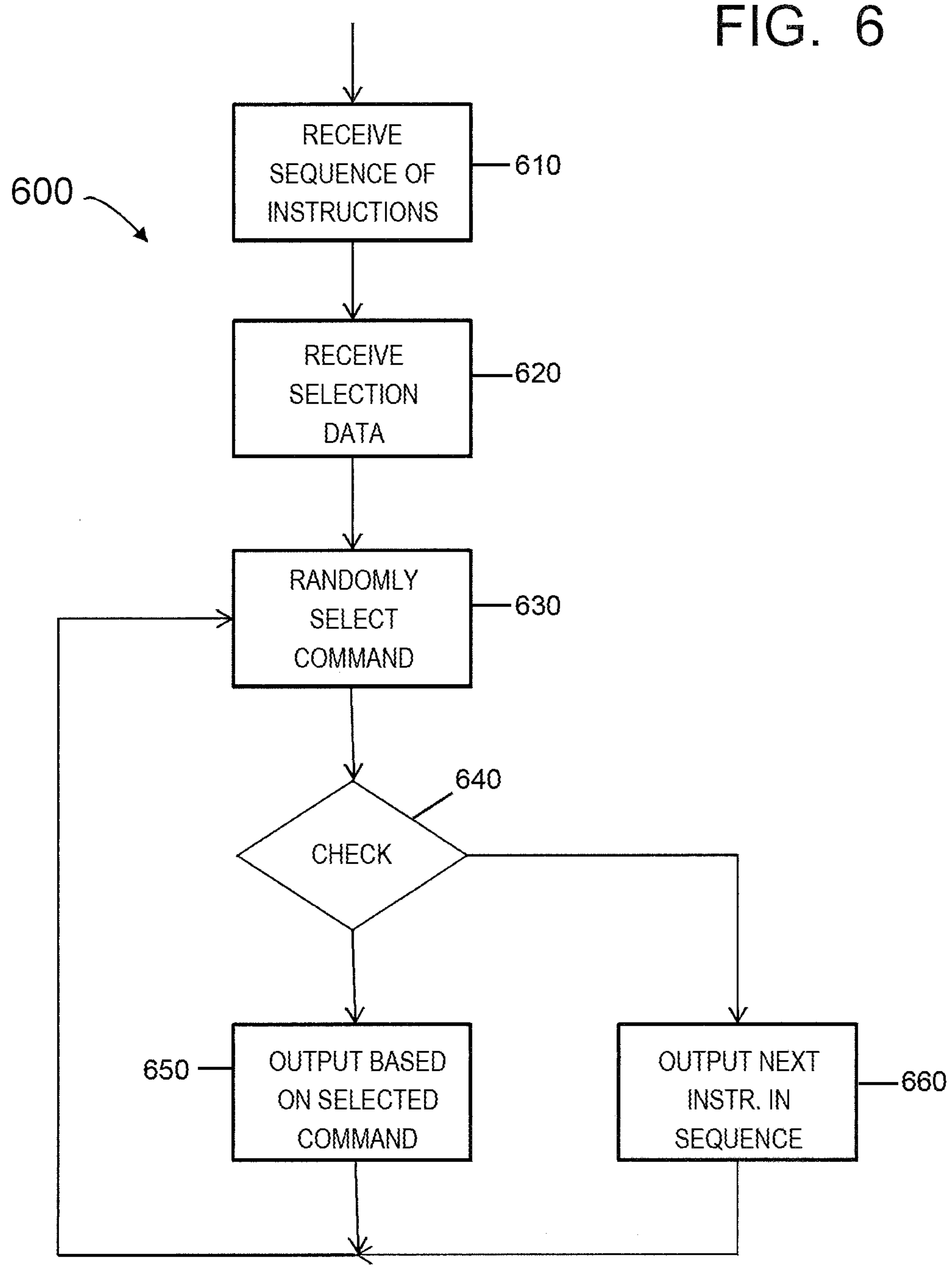
FIG. 6 shows a schematic flowchart of a method of generating instructions in accordance with an aspect of the present disclosure.

FIG. 6 shows a schematic flowchart 600 of a method of generating instructions in accordance with an aspect the present disclosure, e.g. as described herein.

At step 610, a sequence of instructions is received. At step 620, selection data representative of a plurality of commands including a special command is received. At step 630, when a new instruction is required, a command is randomly selected from the received plurality of commands. At step 640, the method checks whether the selected command is the special command. If the selected command is not the special command, the method proceeds to step 650, where an instruction is output based on the selected command. If the selected command is the special command, the method proceeds from step 640 to step 660 and a next instruction in the sequence of instructions is output. At step 650/step 660, the instruction generated/outputted is put into an instruction list (queue). Whenever the interface is ready and the instruction queue is not empty, the driver picks the first element from the instruction queue and drives it to the interface. The method returns from step 650/step 660 to step 630.

More concretely, when the prerequisites for command/instruction generation are met, a new command is selected at step 630 according to the weight specified in selection data, e.g. in a parameter table, given to a simulation run. A simple example of such a parameter table is as follows:

```
CmdSelector =
{
// code        name            weight
    { 0,       "No Op",        8 }
    { 1,       "Reg Write",    30 }
    { 2,       "Reg Read",     30 }
    { 3,       "Reset",        2 }
    { 4,       "Mailbox",      30 }
};
```

At step 640, the system, e.g. a repetition component or a command generator of the system, checks whether a sequence condition is met, i.e. whether the selected command is a special command, e.g. a "Mailbox" command. In the beginning, that is if no mailbox sequence is active, this could be something simple like the selection of a mailbox command from a probability table as shown above. In case a message has already been written to the mailbox, the sequence condition might also check for a mailbox interrupt.

As more specifically described in the following example, a mailbox read operation is shown, i.e. the reception of a message. If the sequence condition is met, the new command is not selected randomly, but taken from a string table, i.e. from a given sequence of instructions. An example of such a string table is:

```
READ 0x100                          // MB control
READ 0x104                          // MB header
READ 0x200                          // MB data 0
...
READ 0xxyz                          // MB data n
CLEAR      0x100 0x8000FFFF         // MB control
CLEAR      0x108 0x00000001         // MB interrupt
```

The instruction that is added to the instruction list would be a register read instruction to register 0x100, which is the mailbox control register. In the next iteration of the command/instruction generation loop, again the sequence condition is checked. If again a mailbox command is selected, depending on the weight (probability) of commands, the next instruction is also taken from the string table, which would add a register read operation to the back of the instruction list. After all instructions from the string table have been added to the instruction list, a new sequence table can be selected. In case the sequence condition is not met, an instruction (corresponding to the selected command) other than a mailbox instruction is selected randomly.

The resulting command stream seen at the interfaces of the DUV is therefore fully random, but the mailbox commands inside the command stream are ordered according to the sequence defined in string tables. If specified, the data patterns are taken from the sequence table, if no data is given for write type commands, random data is generated (e.g. for mailbox data registers).

Using this mechanism it is possible to easily check complex mailbox sequences without sacrificing the randomness of the command stream.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of aspects of the present invention has been presented for purposes of illustration and description, but is not intended to be exhaustive or limited to the invention in the form disclosed. Many modifications and variations will be apparent to those of ordinary skill in the art without departing from the scope and spirit of aspects of the invention. The embodiment was chosen and described in order to best explain the principles of aspects of the invention and the practical application, and to enable others of ordinary skill in the art to understand aspects of the invention for various embodiments with various modifications as are suited to the particular use contemplated.

What is claimed is:

1. A method of generating computer instructions, comprising:
- receiving a sequence of instructions, the sequence having an order in which instructions of the sequence of instructions are to appear relative to each other;
- receiving selection data representative of a plurality of commands including a special command; and
- repeatedly selecting one of the plurality of commands, performing, for each iteration of the repeatedly selecting, a check whether the selected command of the plurality of commands is the special command, and outputting a computer instruction to a computer instruction queue based on the checking whether the selected command is the special command, wherein the outputting of the computer instruction comprises:
  - outputting to the computer instruction queue a next instruction of the sequence of instructions based on the checking indicating that the selected command is the special command; and
  - outputting to the computer instruction queue an instruction associated with the selected command based on the checking indicating that the selected command is not the special command.

2. The method of claim 1, wherein the repeatedly selecting, checking, and outputting produces a command stream, wherein based on the outputting being based on the checking whether the selected command is the special command, instructions of the sequence of instructions appear in random positions in the command stream, and wherein, based on the sequence of instructions having the order in which instructions of the sequence of instructions are to appear, instructions of the sequence of instructions appear inside the command stream in that order relative to each other.

3. The method of claim 1, wherein the repeatedly selecting selects the selected command from the plurality of commands and wherein, for each selection of the repeatedly selecting, each command of the plurality of commands is available for selection.

4. The method of claim 1, wherein the selection data is representative, for each of the plurality of commands, of a weight associated with the respective command and wherein the selecting the one of the plurality of commands is further based on the weight of one or more of the plurality of commands.

5. The method of claim 1, wherein the sequence of instructions includes mailbox commands.

6. The method of claim 1, wherein the outputting outputs to the computer instruction queue an instruction associated with the selected command based on the checking indicating that the selected command is not the special command, wherein the instruction associated with the selected command is not a mailbox instruction.

7. A computer instruction generating system comprising:
- a memory, and
- a processor in communication with the memory, wherein the computer instruction generating system is configured to perform a method comprising:
  - receiving a sequence of instructions, the sequence having an order in which instructions of the sequence of instructions are to appear relative to each other;
  - receiving selection data representative of a plurality of commands including a special command; and
  - repeatedly selecting, by a processing circuit, one of the plurality of commands, performing, for each iteration of the repeatedly selecting, a check whether the selected command of the plurality of commands is the special command, and outputting a computer instruction to a computer instruction queue based on the checking whether the selected command is the special command, wherein the outputting of the computer instruction comprises:
    - outputting to the computer instruction queue a next instruction of the sequence of instructions based on the checking indicating that the selected command is the special command; and
    - outputting to the computer instruction queue an instruction associated with the selected command based on the checking indicating that the selected command is not the special command.

8. The system of claim 7, wherein the repeatedly selecting, checking, and outputting produces a command stream, wherein based on the outputting being based on the checking whether the selected command is the special command, instructions of the sequence of instructions appear in random positions in the command stream, and wherein, based on the sequence of instructions having the order in which instructions of the sequence of instructions are to appear, instructions of the sequence of instructions appear inside the command stream in that order relative to each other.

9. The system of claim 7, wherein the repeatedly selecting selects the selected command from the plurality of commands and wherein, for each selection of the repeatedly selecting, each command of the plurality of commands is available for selection.

10. The system of claim 7, wherein the selection data is representative, for each of the plurality of commands, of a weight associated with the respective command and wherein the selecting the one of the plurality of commands is further based on the weight of one or more of the plurality of commands.

11. The system of claim 7, wherein the sequence of instructions includes mailbox commands.

12. The system of claim 7, wherein the outputting outputs to the computer instruction queue an instruction associated with the selected command based on the checking indicating that the selected command is not the special command, wherein the instruction associated with the selected command is not a mailbox instruction.

13. A computer program product for generating computer instructions, the computer program product comprising:

a non-transitory computer readable storage medium readable by a processing circuit and storing instructions for execution by the processing circuit for performing a method comprising:

receiving a sequence of instructions, the sequence having an order in which instructions of the sequence of instructions are to appear relative to each other;

receiving selection data representative of a plurality of commands including a special command; and repeatedly selecting one of the plurality of commands, performing, for each iteration of the repeatedly selecting, a check whether the selected command of the plurality of commands is the special command, and outputting a computer instruction to a computer instruction queue based on the checking whether the selected command is the special command, wherein the outputting of the computer instruction comprises:

outputting to the computer instruction queue a next instruction of the sequence of instructions based on the checking indicating that the selected command is the special command; and outputting to the computer instruction queue an instruction associated with the selected command based on the checking indicating that the selected command is not the special command.

14. The computer program product of claim 13, wherein the repeatedly selecting, checking, and outputting produces a command stream, wherein based on the outputting being based on the checking whether the selected command is the special command, instructions of the sequence of instructions appear in random positions in the command stream, and wherein, based on the sequence of instructions having the order in which instructions of the sequence of instructions are to appear, instructions of the sequence of instructions appear inside the command stream in that order relative to each other.

15. The computer program product of claim 13, wherein the repeatedly selecting selects the selected command from the plurality of commands and wherein, for each selection of the repeatedly selecting, each command of the plurality of commands is available for selection.

16. The computer program product of claim 13, wherein the selection data is representative, for each of the plurality of commands, of a weight associated with the respective command and wherein the selecting the one of the plurality of commands is further based on the weight of one or more of the plurality of commands.

17. The computer program product of claim 13, wherein the outputting outputs to the computer instruction queue an instruction associated with the selected command based on the checking indicating that the selected command is not the special command, wherein the instruction associated with the selected command is not a mailbox instruction.

* * * * *